United States Patent [19]

Hasegawa et al.

[11] Patent Number: 5,406,389
[45] Date of Patent: Apr. 11, 1995

[54] METHOD AND DEVICE FOR IMAGE MAKEUP

[75] Inventors: Takanori Hasegawa; Junji Takahashi; Noboru Inamine; Kazuo Nakano, all of Tokyo, Japan

[73] Assignee: Riso Kagaku Corporation, Tokyo, Japan

[21] Appl. No.: 932,693

[22] Filed: Aug. 20, 1992

[30] Foreign Application Priority Data

Aug. 22, 1991 [JP] Japan .................. 3-210859
Jul. 6, 1992 [JP] Japan .................. 4-178166

[51] Int. Cl.$^6$ .......................................... H04N 1/00
[52] U.S. Cl. ........................................ 358/452; 358/456
[58] Field of Search ............ 358/452, 256, 456, 455, 358/280, 286, 102, 75, 80, 75, 76, 77, 78, 79, 448, 450; 354/75, 105, 266; 340/721, 706, 712, 734; 341/31, 33, 20, 34, 22

[56] References Cited

U.S. PATENT DOCUMENTS

| | | | |
|---|---|---|---|
| 4,760,458 | 7/1988 | Watanabe et al. | 358/256 |
| 4,862,200 | 8/1989 | Hicks | 354/75 |
| 4,914,475 | 4/1990 | Sugishima et al. | 355/202 |
| 4,920,337 | 4/1990 | Kuo | 340/721 |
| 5,079,625 | 1/1992 | Kitamura et al. | 358/75 |
| 5,086,317 | 2/1992 | Sugishima et al. | 355/218 |
| 5,115,399 | 5/1992 | Nimura et al. | 364/449 |
| 5,122,787 | 6/1992 | Fujita et al. | 340/712 |
| 5,142,355 | 8/1992 | Fujima | 358/75 |
| 5,150,311 | 9/1992 | Long et al. | 395/108 |
| 5,194,862 | 3/1993 | Edwards | 341/20 |
| 5,194,863 | 3/1993 | Barker et al. | 341/31 |
| 5,218,460 | 6/1993 | Nakajima | 358/456 |
| 5,241,308 | 8/1993 | Young | 341/34 |
| 5,247,372 | 9/1993 | Tsutamori et al. | 358/452 |
| 5,262,760 | 11/1993 | Iwamura et al. | 345/145 |

FOREIGN PATENT DOCUMENTS

| | | |
|---|---|---|
| 83989 | 7/1983 | European Pat. Off. . |
| 179373 | 4/1986 | European Pat. Off. . |
| 489582 | 6/1992 | European Pat. Off. . |
| 2139846 | 11/1984 | United Kingdom . |

*Primary Examiner*—Paul Ip
*Attorney, Agent, or Firm*—Dickstein, Shapiro, & Morin

[57] ABSTRACT

To the end of allowing an image makeup process to be easily and efficiently carried out even when different image makeup functions are to be applied to different regions of a single original image without requiring a plurality of region designating sheets, a region designating sheet Sw carrying region designating images is photoelectrically read, the region designating images of the region designating sheet Sw are displayed on a display unit, region designating data for specifying the regions to which image makeup functions are to be applied is obtained through a specifying process conducted on the region designating images displayed on the display unit by using a touch panel, available image makeup functions for each of the regions specified by this specifying process are displayed on the display unit, and the image makeup functions are applied to the designated regions by obtaining image makeup function designating data through a specifying process conducted on the list of image makeup functions displayed on the display unit by using the touch panel.

7 Claims, 7 Drawing Sheets

METHOD AND DEVICE FOR IMAGE MAKEUP

INDUSTRIAL UTILITY

The present invention relates to a method and device for applying image makeup functions to different regions of an original image in such technical fields as master plate making and duplication. The image makeup functions may include various forms of image processing such as a halftone process, reversal, coloring, bordering, and so on.

BACKGROUND OF THE INVENTION

Conventionally, a digital process for making a master plate is well known as a method of making stencil master plates for stencil printing. In the digital master plate making method, an original is photoelectrically read by using an image scanner, and a heat sensitive film of a thermal stencil master plate made of thermoplastic resin is perforated in the manner of a dot matrix by selectively and individually driving a plurality of dot-like heat emitting elements of a thermal head.

In the above described digital method of making a master plate, it has been proposed to photoelectrically read a region designating sheet carrying region designating images separately from the original image, and carry out an image makeup function, such as halftone, reversal, outlining (converting characters into outlined characters), and photography mode, on designated regions of the original corresponding to selected region designating images.

Conventionally, the above described image makeup processing was conducted by setting up image makeup functions such as halftone, reversal, outlining and photography mode from a keyboard, and photoelectrically reading region designating images which are drawn on a region designating sheet. By drawing a plurality of region designating images on the region designating sheet, it is possible to designate a plurality of regions for an image makeup function.

However, even when a plurality of regions are defined on an original with the intention of applying makeup functions thereto by drawing a plurality of region designating images on a single region designating sheet, the image makeup functions can be set up with only one kind for each region designating sheet, and it has not been possible to apply a different image makeup function to each of the designated regions.

Therefore, conventionally, when different image makeup functions such as halftone and reversal are to be applied to different parts of an original image, it has been necessary to prepare a region designating sheet carrying region designating images for each different image makeup function, to sequentially set up each image makeup function from a keyboard, and to sequentially read the region designating sheets each carrying different region designating images in the order of setting up the image makeup functions from the keyboard.

In the above described method, however, the user must remember the order of the image makeup functions which he had set up from the keyboard, and must supply each of the region designating sheets to a read out unit in the same order. This procedure is so complicated that the user can make errors. Such errors in the image makeup process can be found only after a test print is made, and this causes wasting of stencil master plates as well as of printing paper.

Further, region designating images displayed on the display unit are line images freely drawn by the user on a region designating sheet, and the touch panel consists of a matrix of switch segments each approximately 1 cm square. Therefore, when a plurality of region designating images are drawn on the region designating sheet close to each other, there is a possibility that two different region designating images may fall on a same square switch segment. In such a case, pressing such a switch segment means an indeterminate instruction, and would not specify a desired one of the region designating images.

BRIEF SUMMARY OF THE INVENTION

The present invention was made in view of such problems of the prior art, and its primary object is to provide a method and device for applying different image makeup functions to different regions of an original image which are both simple and efficient.

A second object of the present invention is to provide a method and device for image makeup which are suitable for making stencil master plates and economical to use by eliminating the need for using a plurality of region designating sheets when applying different image makeup functions to different regions of an original image.

A third object of the present invention is to provide a method and device for image makeup which are suitable for making stencil master plates and simple to use because the result of the image makeup can be displayed on a display unit before making a test print.

A fourth object of the present invention is to provide a method and device for image makeup which allows selection of desired region designating images on a region designating sheet by using a touch panel mounted on a front surface of the display unit in an easy and efficient manner.

According to the present invention, these and other objects can be accomplished by providing an image makeup method comprising the steps of photoelectrically reading a region designating sheet carrying region designating images thereon, and applying prescribed image makeup functions on regions of an original image corresponding to the region designating images on that region designating sheet, further comprising the steps of: (a) displaying that region designating images photoelectrically read from that region designating sheet on a display unit; (b) inputting region specifying data for specifying regions to which the image makeup functions are to be applied by selectively specifying regions from region designating images displayed on that display unit; (c) displaying a list of available image makeup functions that can be applied to each of that designated regions; (d) inputting a selected one of that image makeup functions by selecting from that list displayed on that display unit; (e) applying the selected image makeup function to a selected one of that specified regions of that original image; and (f) repeating steps (b) through (e) until all of that regions of that original image are subjected to that step of applying a selected one of that image makeup functions.

According to such a structure, region designating images read from the region designating sheet are displayed on the display unit, and the user can individually select and specify each of the regions that is to be the subject of an image makeup function by operating the selection specifying input unit while watching the region designating images displayed on the display unit.

Available image makeup functions are displayed on the display unit for each of the specified regions, and the user can specify the image makeup function that is to be applied to each of the specified regions so that an individually selected image makeup function may be applied to each of the specified designated regions.

According to a preferred embodiment of the present invention, the region designating sheet carries a plurality of image designating images thereon, and the display unit displays all of the region designating images as they are located on the region designating sheet so that region specifying data can be selected for specifying the regions for the corresponding image makeup functions and that function specifying data for specifying an image makeup function for each of the specified regions may be inputted on-an one-on-one basis in a sequential manner, and each of the individually selected image makeup functions may be applied to an individually selected one of the designated regions.

According to a preferred embodiment, step (b) of inputting region specifying data for specifying regions to which the image makeup functions are to be applied is made from a touch panel comprising a plurality of segments, and attached to a front surface of that display unit. To the end of achieving a required resolution power by using a touch panel comprising a limited number of segments, the present invention may provide that, if a segment containing two or more of that region designating images is pressed in the step (b), or if two or more of the segments containing two or more of the region designating images are pressed in the step (b), the region designating images are displayed at an enlarged scale so that a desired one of the region designating images may be selected by pressing one of the segments of the touch panel.

The method of the present invention may be advantageously implemented by using an image makeup processing device for photoelectrically reading a region designating sheet carrying region designating images thereon, and applying prescribed image makeup functions to various regions of the original image corresponding to the positions of that region designating images, comprising: a planar display unit; a region designating image display process unit for carrying out the process of displaying the region designating images photoelectrically read from the region designating sheet on a display unit as they are located on that region designating sheet; a function display process unit for carrying out the process of displaying image makeup functions that can be applied to that designated regions of that original image on that display unit; a selection specifying input unit of a pointing device type for selectively specifying regions from the image displayed on that display unit, and inputting region specifying data for specifying the regions to which that image makeup functions are to be applied, and function specifying data for specifying the makeup functions that are to be applied to that specified regions; and a makeup processing unit for applying that image makeup functions specified by that selection specifying input unit on that regions specified by that selection specifying input unit.

BRIEF DESCRIPTION OF THE DRAWINGS

Now the present invention is described in the following in terms of a specific embodiment with reference to the appended drawings, in which.

DETAILED DESCRIPTION OF THE PREFERRED EMBODIMENT

Figure 1:
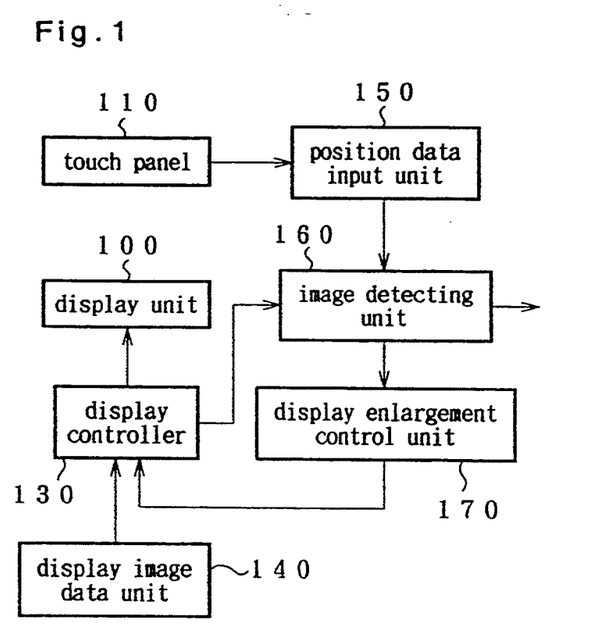
FIG. 1 is a block diagram of a device for selectively specifying regions of an image displayed on a display unit according to the present invention.

FIG. 1 shows the basic structure of a device for selectively specifying a region of an image on a display unit according to the present invention. This device comprises a display unit 100 consisting of a CRT or LCD monitor, and a normal touch panel 110 mounted on the front surface of the display unit 100 for allowing a position input from each of a plurality of segments defined therein.

The display unit 100 is controlled by a display controller 130 so that the display unit 100 may display an image stored as display image data in a display image data unit 140 at a prescribed magnification factor. The touch panel 110 is connected to a position data input unit 150 which generates position data according to the position input received from the touch panel 110 to determine a designated region as described hereinafter.

The position data input unit 150 is connected to an image detecting/counting unit 160 which receives designated region data from the position data input unit 150 and data on the current display on the display unit 100 from the display controller 130 for the purpose of determining if there are a plurality of images in the region designated by the position input from the touch panel 110.

When the image detecting/counting unit 160 has detected that there is only one image in the region designated by the touch panel 110, the image detecting-/counting unit 160 supplies the data on the designated region to a processing unit not shown in the drawing for selectively specifying the region. On the other hand, when it is determined that there are a plurality of images in the designated region, the image detecting/counting unit 160 supplies a display enlarge command signal to a display enlarge control unit 170.

The display enlarge control unit 170, when a display enlarge command signal is received, computes an enlargement factor and a display coordinate so that the display images falling on a same segment of the touch panel 110 may be located in different segments of the touch panel 110, and supplies data on the enlargement factor and the display coordinate to the display control unit 130 so that the images in the designated region may be automatically enlarged on the display unit 100 in a proper location at a proper enlargement factor.

In this way, when there are a plurality of images in the same segment of the touch panel that is selectively specified, the images are automatically enlarged in such a manner that the images may fall on different segments of the touch panel 110. Thus, an accurate selective specification of the image can be accomplished without complicating the structure of the touch panel or the procedure for the entry from the touch panel.

Figure 2:
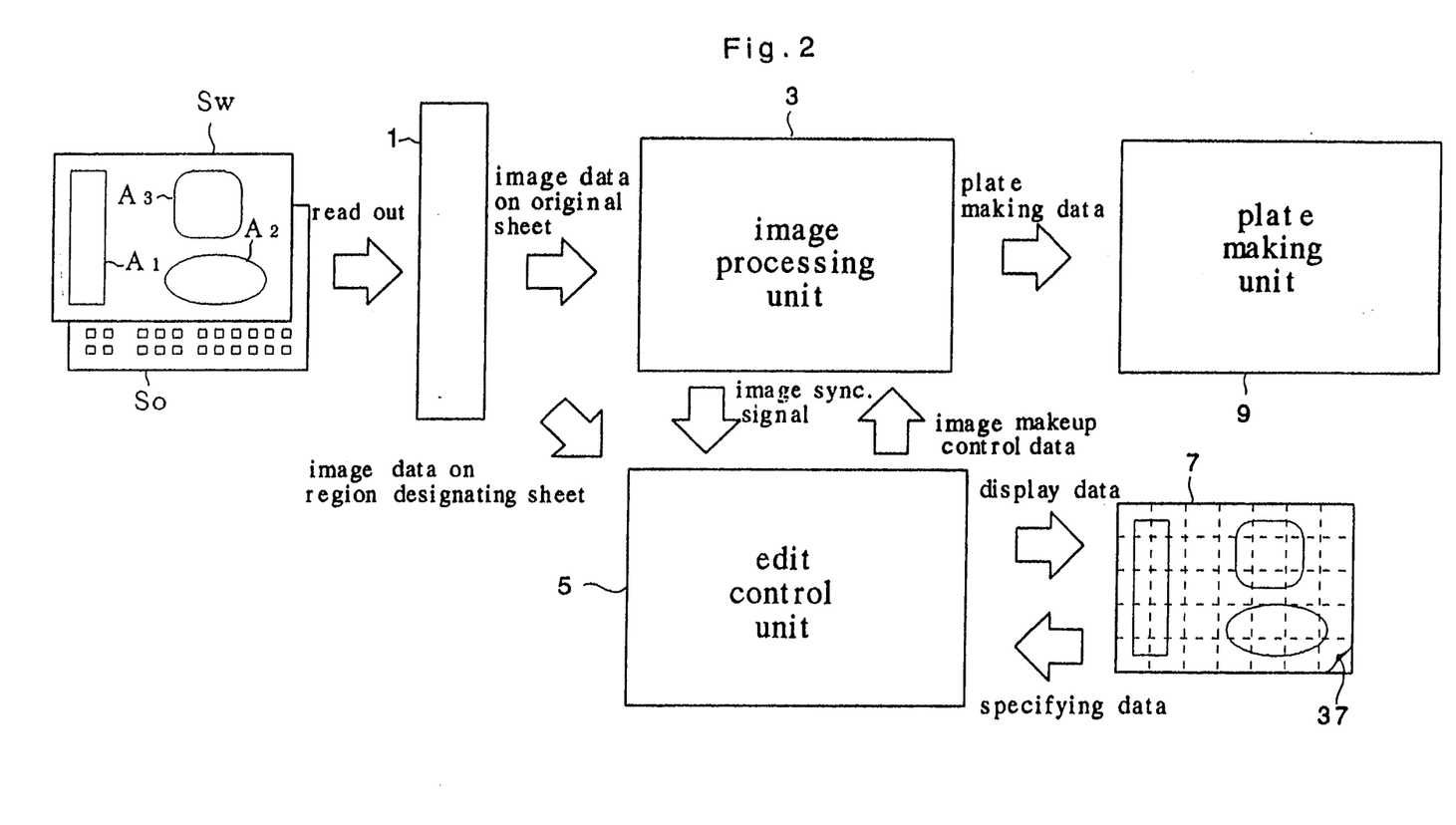
FIG. 2 is a diagram illustrating the procedure for applying different image makeup functions to different regions of an original image in a digital master plate making device according to the present invention.
Figure 3:
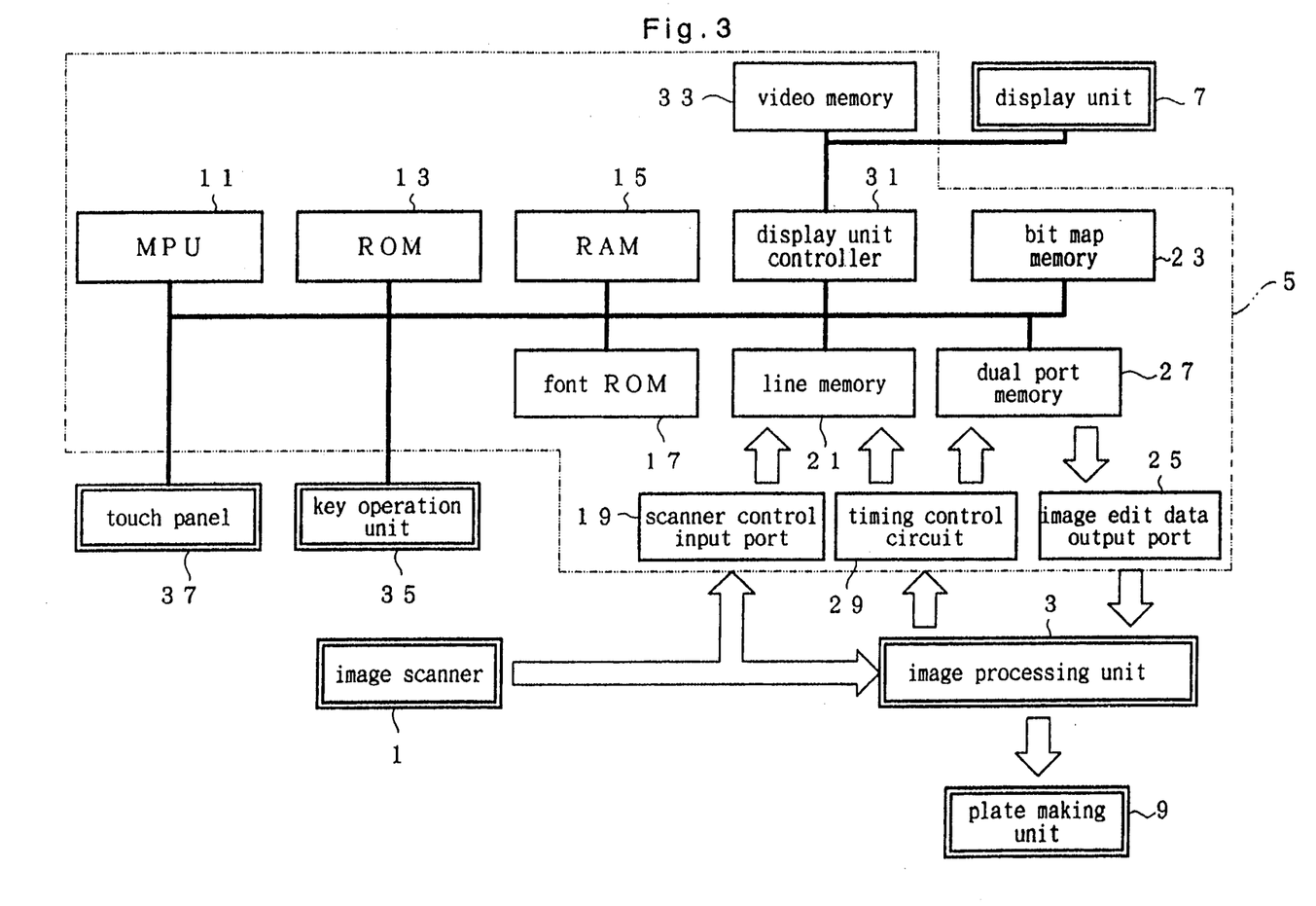
FIG. 3 is a block diagram of a device for applying different image makeup functions to different regions of an original image in a digital master plate making device according to the present invention.

FIGS. 2 and 3 show an embodiment of an image makeup processing device of the present invention applied to a digital master plate making device. This image makeup processing device comprises an image scanner unit 1 which can photoelectrically read an image of an original sheet So and an image of a region designating sheet (a window sheet) Sw, an image processing unit 3 for various image processing functions including image makeup functions according to image data supplied from the image scanner unit 1, an edit control unit 5 for data inputting and outputting control, and display control, a planar display unit 7 consisting of an LCD unit or the like, and a master plate making unit 9 for making a thermal stencil master plate by using a thermal head according to the data supplied by the image processing unit 3.

The edit control unit 5 controls various devices according to a program, and comprises an MPU 11 for controlling each of the devices according to a program and change data on the region associated with each of the selected and specified image makeup functions, a ROM 13 for storing the program and display image data, a RAM 15 used as a work memory of the MPU 11, a font ROM 17 for storing the character font for displaying available image makeup functions on the display unit 7, a line memory 21 for receiving and storing serial data related to region designating images from an input port scanner 19, a bit map memory 23 for storing data which is modified according to the selected and specified image makeup function, a dual port memory 27 for receiving data from the bit map memory 23 and supplying it to an image makeup control data output port 25, a timing control circuit 29 for synchronizing the data input and output in the line memory 21 and the dual port memory 27 with a synchronization signal supplied from the image processing unit 3, a display unit controller 31 for controlling the display unit 7, and a display video memory 33 for retaining data on the image displayed on the display unit 7.

The scanner input port 19 is connected to the image scanner unit 1 so that image data of the region designating sheet may be received therefrom.

An image makeup control output port 25 is connected to the image processing unit 3 for supplying image makeup control data thereto.

To the edit control unit 5 is connected a key operation unit 35 for entering such user operation signals as start and stop signals for the plate making device to the edit control unit 5.

To the front surface of the display unit 7 is attached to a touch panel 37 serving as a selection specifying input unit of a pointing device type. Through the use the touch panel 37, simply by touching it, the user can select the images displayed on the display unit 7, enter region specifying data to the edit control unit 5 for specifying a region to which an image makeup function is to be applied, and enter function specifying data for specifying the image makeup function that is to be applied. In this embodiment, the touch panel 37 comprises 5 by 7 or 35 square segments as illustrated in FIG. 2.

Figure 4:
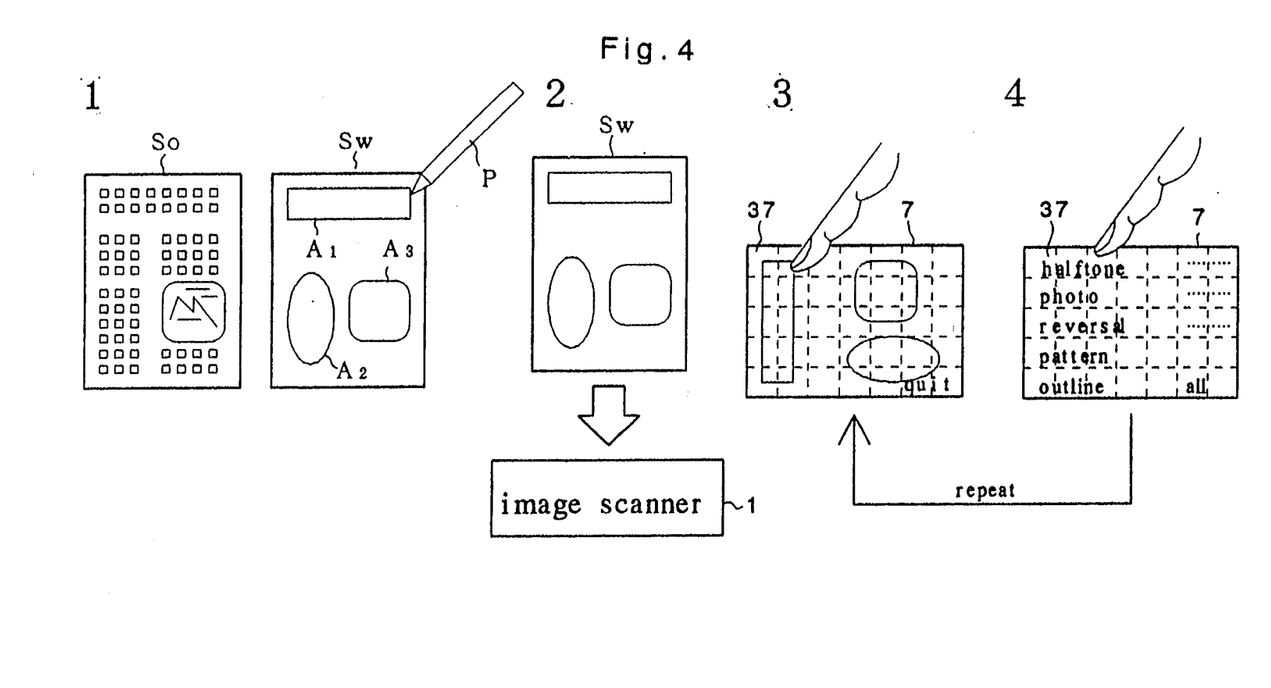
FIG. 4 is a diagram showing the procedure for selectively specifying a region of an original image for the purpose of applying a desired image makeup function thereto according to the present invention.
Figure 5:
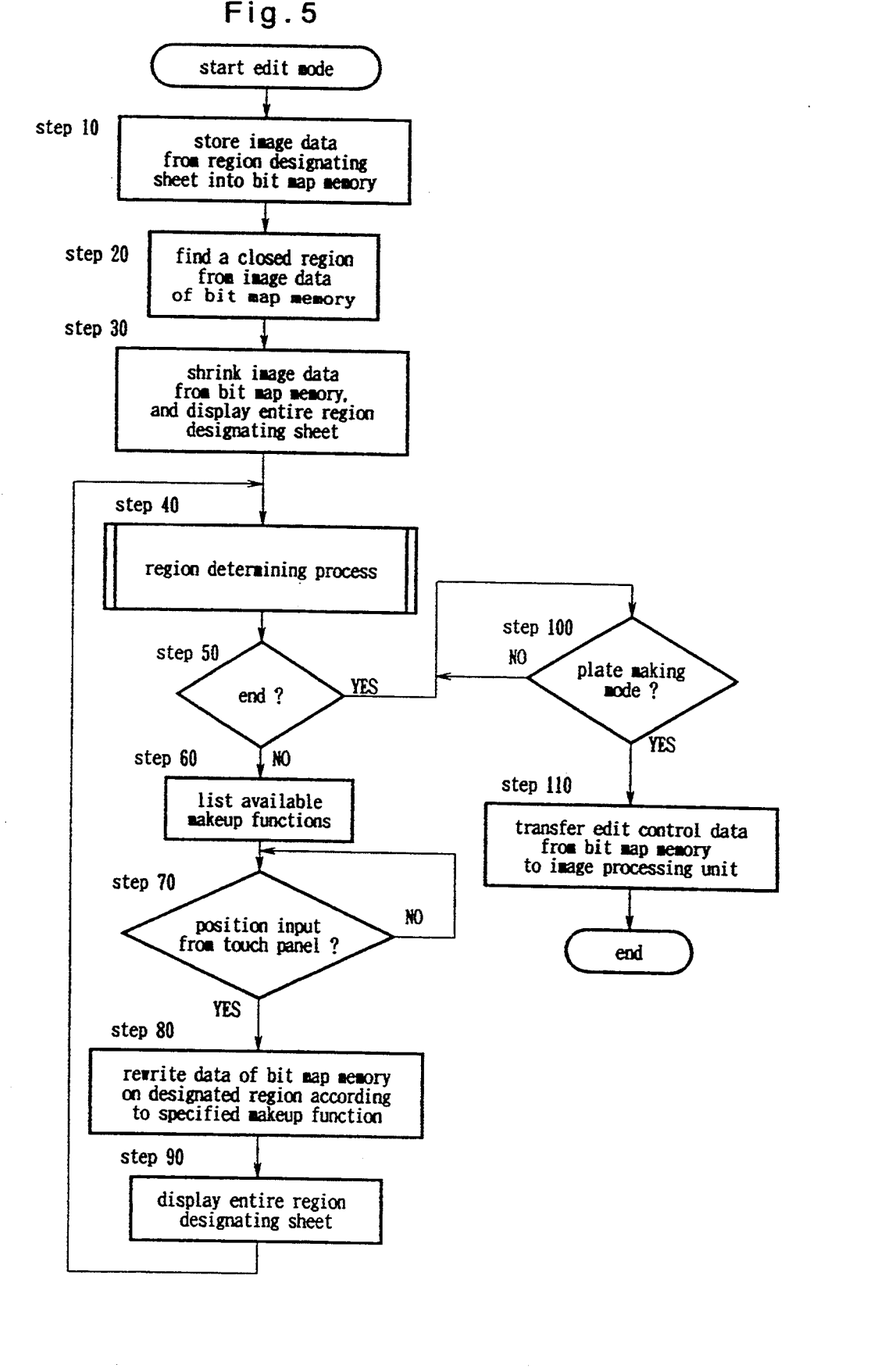
FIG. 5 is a flow chart showing the procedure for applying different image makeup functions to different regions of an original image in a digital master plate making device according to the present invention.

Now, the procedure of image makeup and the operation of the master plate making unit are described in the following with reference to the operation procedure diagram of FIG. 4 and the flow chart of FIG. 5.

A region designating sheet Sw is composed of a sheet of regular paper, tracing paper, or transparent plastic film.

Procedure (1): the region designating sheet Sw is placed over an original So, and a border line surrounding a region to which an image makeup function is to be applied is drawn by using a felt marker pen P on the region designating sheet Sw. Thus, region designating images are drawn on the region designating sheet Sw by border lines. In this example, as shown in FIG. 4, there are three region designating images as denoted by A1, A2 and A3.

Procedure (2): an image makeup mode is set up from the touch panel 37 from a menu shown on the display unit 7. Then, the region designating sheet Sw is photoelectrically read out by using the image scanner 1.

When this image read out process is finished, the plate making device receives image data obtained from the region designating sheet Sw, and stores the image in the bit map memory 23 of the edit control unit 5 after carrying out a shrinking process on the data (step 10). The MPU 11 of the edit control unit 5 detects the regions surrounded by the border lines or the region designating images A1, A2 and A3 from the image data of the bit map memory 23 (step 20), and transfers the image data of the bit map memory 23 to the video memory for display 33. Thus, the entire image of the region designating sheet Sw including the region designating images A1, A2 and A3 as they are arranged in the region designating sheet Sw is displayed on the display unit 7 along with the word "END" (step 30), and the edit control unit 5 carries out a region determining process routine shown in FIG. 6 (step 40).

Figure 6:
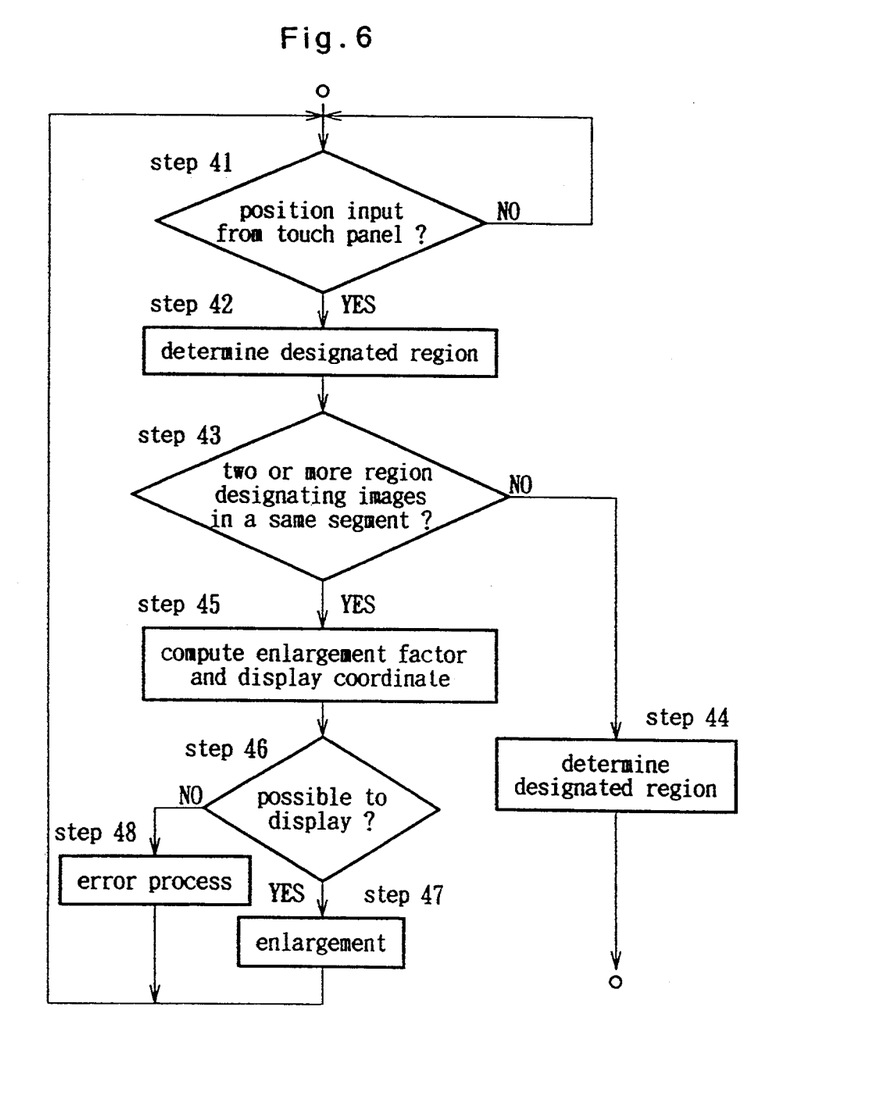
FIG. 6 is a flow chart showing the procedure for selectively specifying a region of the original image by using a touch panel according to the present invention.

Procedure (3): When the region determining process routine is being executed, according to what is displayed on the display unit 7, the user selects one of the region designating images by touching a corresponding one of the region designating images A1, A2 and A3 on the touch panel 37 attached to the screen of the display unit 7. Thus, position data is entered for selectively specifying one of the region designating images (step 41).

The edit control unit 5 then inputs position data from the touch panel 37 as the region specifying data, and carries out a routine for determining if one of the region designating images is properly specified (step 42).

When the position input from the touch panel 37 corresponds to two or more of a plurality of designated regions, the determination of the region designating image is carried out over a region containing these regions.

When there is only one region designating image in this designated region, the edit control unit 5 carries out a determination process for this designated region (step 44), and ends the region determination process routine. Then the system flow returns to step 50 of the flow chart shown in FIG. 5.

Figure 7:
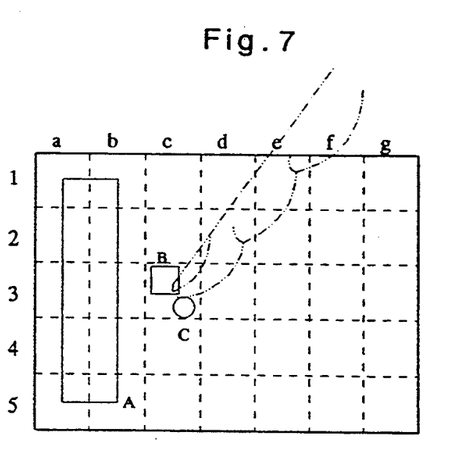
FIG. 7 shows an example of the display on the display unit equipped with a touch panel.

On the other hand, when there are a plurality of region designating images B and C in the selected segment (3, c) as illustrated in FIG. 7, the edit control unit 5 computes an enlargement factor and a display coordinate so as to place the region designating images B and C in different segments of the touch panel 37 (step 45). The edit control unit 5 checks if the computed enlargement factor and display coordinate will result in a desired result (step 46), and if it is ascertained that a desired result will be produced, the region designating images B and C which fell on the same segment (3, c) of the touch panel 37 are now automatically enlarged at the computed enlargement factor and at the computed coordinate as illustrated in FIG. 8 (step 47).

Thereafter, the system flow returns to step 41, and waits for a position input to be made from the touch panel 37. Therefore, if the segment (3, d) of the touch panel 37 is pressed in this enlarged condition, as only the region designating image B is located in this segment, the specified region is thus finally determined.

Figure 8:
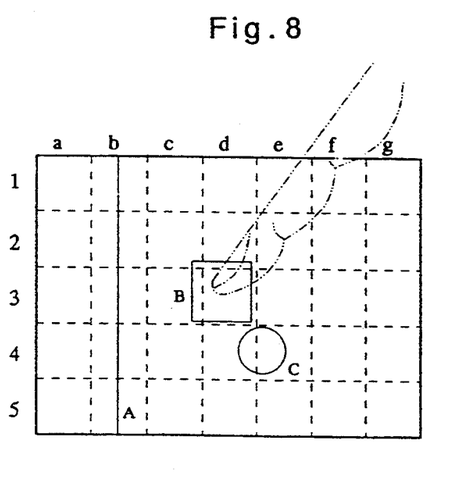
FIG. 8 shows the display on the display unit when a part of the display shown in FIG. 7 is enlarged for increased resolution power according to the present invention.

When the segments (3, d) and (4, d) of the touch panel 37 are pressed at the same time in this enlarged condition illustrated in FIG. 8, these two segments (3, d) and (4, d) are regarded as a single segment, and as there are two region designating images B and C in these segments, the displayed images are further enlarged. If such an enlargement is indeed possible, the images in these two segments (3, d) and (4, d) are enlarged at a greater enlargement factor.

If any further enlargement is required but is not possible, an error process including an error display is carried out (step 48), and, with the current display on the display unit maintained as it is, the system flow returns to step 41 to be ready for a new position input from the touch panel 37.

When this determination process is completed, the region determination process routine is ended, and it is determined if the thus determined designated region corresponds to the item "END" in the menu or not (step 50). If the result of this determination process does not correspond to the item "END", and the determined designated region corresponds to a region designating image, the edit control unit 5 switches the display on the display unit 7 to the list of available image makeup functions (step 60), and the edit control unit 5 waits for the input of position data from the touch panel (step 70). At this time, the list of available image makeup functions may be superimposed over the region designating images on the display.

Procedure (4): When the display unit shows the list of available image makeup functions, the user touches a region of the front surface of the display unit 7 corresponding to one of the image makeup functions so as to select and specify one of the image makeup functions by touching the panel 37.

When the above described touch operation on the touch panel 37 is conducted, the edit control unit 5 receives position data of the touch panel 37 as region specifying data, and determines which of the image makeup functions it corresponds to, and rewrites data in the designated region of the bit map memory according to the selected image makeup function to use it as the image makeup control data (step 80, 90).

When selectively specifying one of the available image makeup functions, if position input from the touch panel 37 is made such that a plurality of image makeup functions are specified at the same time and the instruction is thus indeterminate, the relevant area of the display may be enlarged so that only one of the functions may be specified at a time.

The list of the image makeup functions includes the item "ALL", and when the item "ALL" and one of the image makeup functions are selected one after the other or simultaneously, all the region designating images A1, A2 and A3 are turned into a designated region, and rewriting of the data according to the specified image makeup function is carried out for all of the region designating images A1, A2 and A3. Then, the image makeup mode is ended.

If "ALL" is not selected, the entire region designating sheet Sw including the region designating images A1, A2 and A3 is again shown on the display unit (step 90), and the edit control unit 5 is ready to accept signals from the touch panel 37 to specify the next region to which an image makeup function is to be applied.

On the screen of the display unit at this point, the region designating images to which image makeup functions are applied are indicated as such, for instance, by displaying the names of the image makeup functions in the corresponding region designating images or actually showing the results of applying the image makeup functions.

When the result of the determination process in step 50 indicates that the designated and determined region corresponds to the item "END", the edit control unit ends the image makeup mode, and the display unit 7 returns to the menu display condition to be ready for accepting the set-up of the plate making mode (step 100). When the master plate making mode is set-up from the touch panel 37, the image makeup control data in the bit map memory 23 is transferred to the dual port memory 27 in synchronism with the photoelectric reading of the original So with the image scanner, and the image makeup control data transferred to the dual port memory 27 is outputted to the image processing unit 3 (step 110).

The image processing unit 3 forms plate making data by superimposing the image data of the original sheet So photoelectrically read out by the image scanner 1 with the image makeup control data from the dual port memory 27.

In this manner, a master plate is made with the original image having each of its designated regions subjected to the corresponding image makeup function.

As described above, according to the image makeup method and image makeup processing device of the present invention, because the region designating images photoelectrically read from a region designating sheet are displayed on the display unit, the user can individually specify the regions to which the image makeup functions are to be applied by operating the selection specifying input unit while watching the region designating images displayed on the display unit, available image makeup functions for each of the regions specified by this specifying process are displayed on the display unit, the user can specify one of the image makeup functions that is to be used by operating the selection specifying input unit while watching the listing of the available image makeup functions displayed on the display unit, and an image makeup function specified in this fashion can be applied to a region specified in this fashion on an individual basis, even when different image makeup functions are to be applied to different regions of a single original image, the process of image makeup can be carried out in an easy manner without requiring a plurality of region designating sheets.

Although the present invention has been described in terms of a specific embodiment, it is possible to modify and alter details thereof without departing from the spirit of the present invention.

What we claim is:

1. An image makeup method comprising the steps of photoelectrically reading a region designating sheet carrying region designating images thereon separately from an original image, and applying prescribed image makeup functions on regions of an original image corresponding to the region designating images on said region designating sheet, further comprising the steps of:

(a) displaying said region designating images photoelectrically read from said region designating sheet on a display unit;
   (b) inputting region specifying data for specifying a region to which one of the image makeup functions is to be applied by selectively specifying one of the region from the region designating images displayed on said display unit;
   (c) displaying a list of available image makeup functions that can be applied to said designated region;
   (d) inputting a selected one of said image makeup functions by selecting from said list displayed on said display unit;
   (e) applying the selected image makeup function to said specified region of said original image; and
   (f) repeating steps (b) through (e) until all of said regions of said original image are subjected to said step of applying a selected one of said image makeup functions.

2. An image makeup method according to claim 1, wherein said region designating sheet carries a plurality of image designating images thereon, and said display unit displays all of said region designating images as they are located on said region designating sheet, said region specifying data for specifying the regions to which the corresponding image makeup functions are applied, said function specifying data for specifying an image makeup function for each of the specified regions, said region specifying data and said function specifying data may be inputted on a one-on-one basis in a sequential manner, and each of said individually selected image makeup functions may be applied to an individually selected one of said designated regions.

3. An image makeup method according to claim 2, wherein said step (b) of inputting region specifying data for specifying regions to which the image makeup functions are to be applied is made from a touch panel comprising a plurality of segments, and attached to a front surface of said display unit; and if a segment containing two or more of said region designating images is pressed in said step (b), said region designating images are displayed at an enlarged scale so that a desired one of said region designating images may be selected by pressing one of said segments of said touch panel.

4. An image makeup method according to claim 2, wherein said step (b) of inputting region specifying data for specifying regions to which the image makeup functions are to be applied is made from a touch panel comprising a plurality of segments, and attached to a front surface of said display unit; and if two or more of said segments containing two or more of said region designating images are pressed in said step (b), said region designating images are displayed at an enlarged scale so that a desired one of said region designating images may be selected by pressing one of said segments of said touch panel.

5. An image makeup processing device for photoelectrically reading a region designating sheet carrying region designating images thereon Separately from an original image, and applying prescribed image makeup functions to various regions of the original image corresponding to the positions of said region designating images, further comprising:

a planar display unit;
   a region designating image display process unit for carrying out the process of displaying the region designating images photoelectrically read from the region designating sheet on a display unit as they are located on said region designating sheet;
   a function display process unit for carrying out the process of displaying image makeup functions that can be applied to said designated regions of said original image on said display unit;
   a selection specifying input unit of a pointing device type for selectively specifying regions from the image displayed on said display unit, and inputting region specifying data for specifying the regions to which said image makeup functions are to be applied, and function specifying data for specifying the makeup functions that are to be applied to said specified regions; and
   a makeup processing unit for applying said image makeup functions specified by said selection specifying input unit on said regions specified by said selection specifying input unit.

6. An image makeup processing device according to claim 5, wherein said selection specifying input unit consists of a touch panel comprising a plurality of segments, and attached to a front surface of said display unit, and said region designating image display process unit enlarges said region designating images so that a desired one of said region designating images may be selected by pressing one of said segments of said touch panel if a segment containing two or more of said region designating images is pressed at the same time.

7. An image makeup processing device according to claim 5, wherein said selection specifying input unit consists of a touch panel comprising a plurality of segments, and attached to a front surface of said display unit, and said region designating image display process unit enlarges said region designating images so that a desired one of said region designating images may be selected by pressing one of said segments of said touch panel if two or more segments containing two or more of said region designating images are pressed at the same time.

* * * * *